May 5, 1925. 1,536,244
L. SUSSMAN
COOKING UTENSIL
Filed Aug. 23, 1923 2 Sheets-Sheet 1

INVENTOR
LEON SUSSMAN
BY
ATTORNEYS

May 5, 1925.

L. SUSSMAN

COOKING UTENSIL

Filed Aug. 23, 1923

1,536,244

2 Sheets-Sheet 2

INVENTOR
LEON SUSSMAN
BY
Lotka, Kehlenbeck & Math
ATTORNEYS

Patented May 5, 1925.

1,536,244

UNITED STATES PATENT OFFICE.

LEON SUSSMAN, OF BAYONNE, NEW JERSEY.

COOKING UTENSIL.

Application filed August 23, 1923. Serial No. 658,851.

*To all whom it may concern:*

Be it known that I, LEON SUSSMAN, a citizen of the United States, and resident of Bayonne, in the county of Hudson and State of New Jersey, have invented certain new and useful Improvements in Cooking Utensils, of which the following is a specification.

My invention relates to cooking utensils, and has for its object to provide an article of this class which will enable the heat to reach uniformly all parts of the food being cooked, which will insure an efficient circulation of the heat and a steady and regularly distributed outflow of the hot gases and vapors, which will permit of cooking (baking) the food in dishes or pans of ordinary size and construction, and which will combine a strong and convenient construction with a pleasing appearance.

Figure 1:
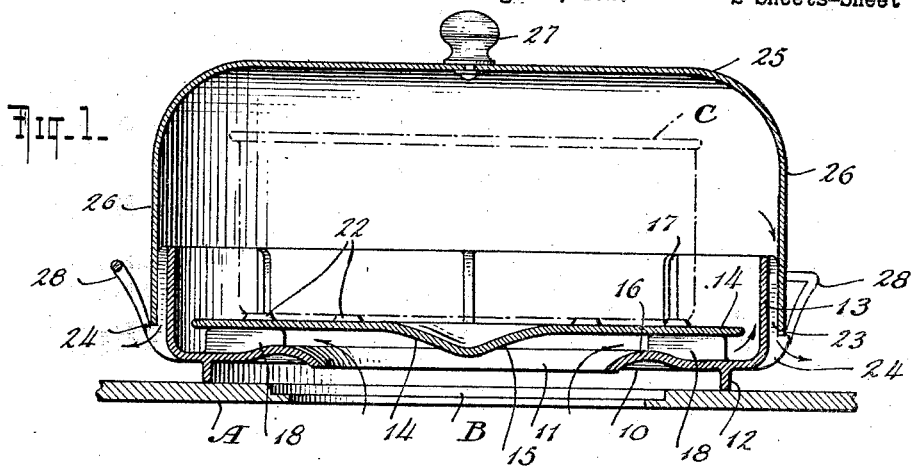
Figure 2:
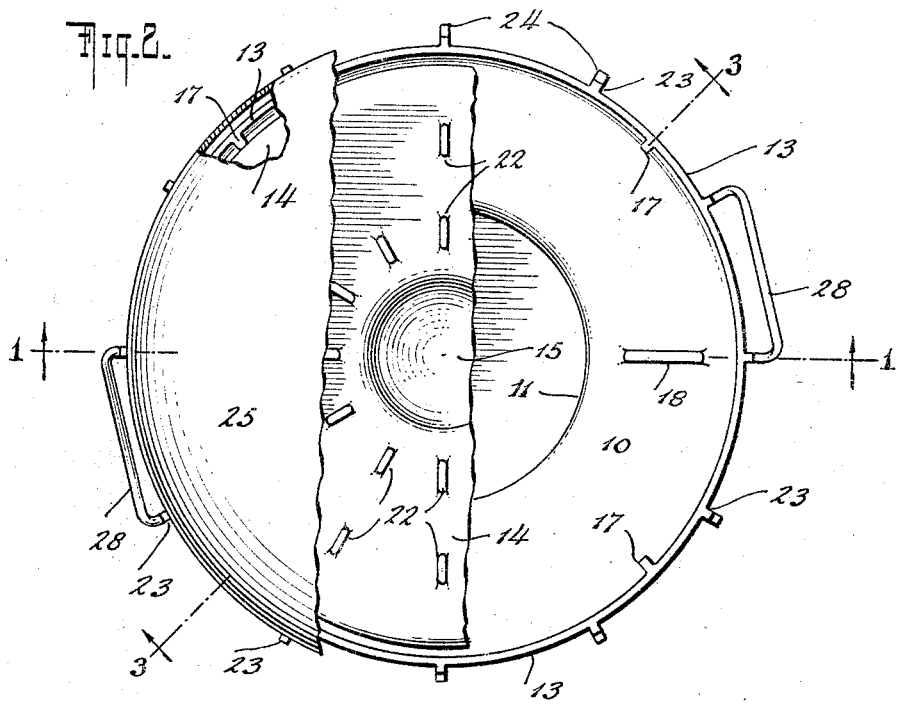
Figure 3:
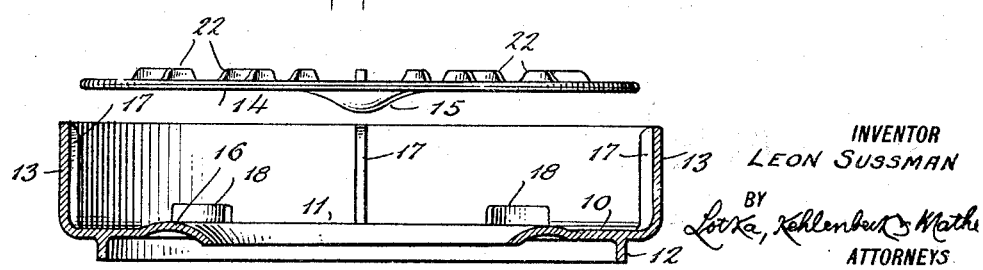
Figure 4:
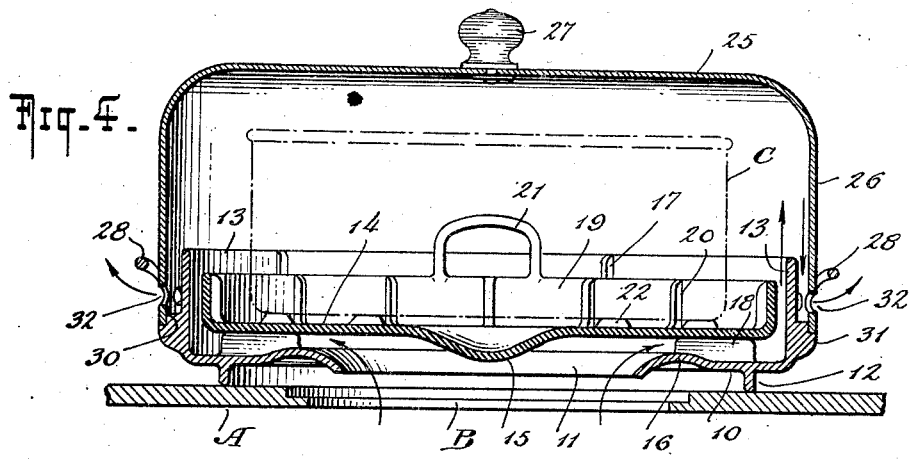
Figure 5:
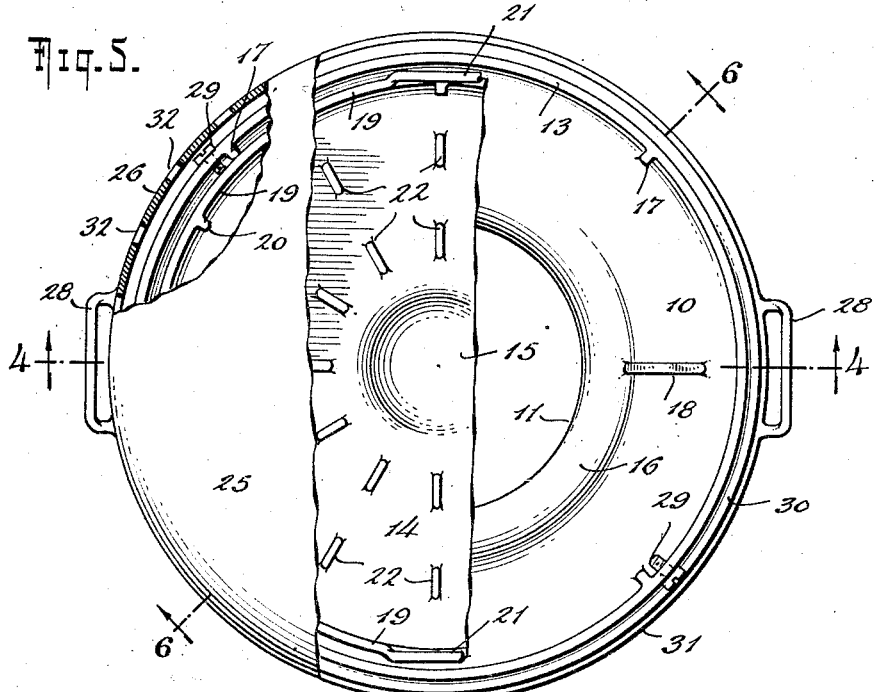
Figure 6:
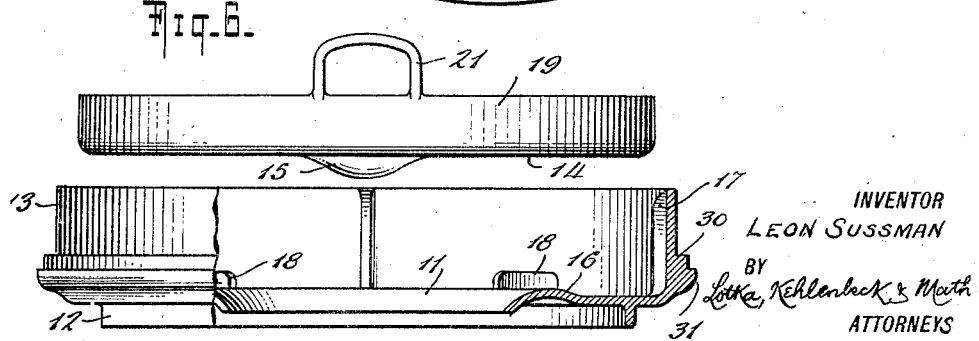

Two satisfactory and preferred embodiments of my invention will now be described in detail with reference to the accompanying drawings, in which Fig. 1 is a vertical section of one form of the utensil or heater, taken on line 1—1 of Fig. 2, and indicating a cooking pot or dish in dotted lines, the heater being shown in place on a stove; Fig. 2 is a plan, with parts broken away and others in section; Fig. 3 is a view showing two of the parts of the cooking utensil or heater, separated, one of these parts being shown in elevation, and the other in vertical section on line 3—3 of Fig. 2; Figs. 4, 5, and 6 show another embodiment in views corresponding substantially to Figs. 1, 2, and 3 respectively, Fig. 4 being a section on line 4—4 of Fig. 5, and the lower member of Fig. 6 being shown partly in section on line 6—6 of Fig. 5.

In Figs. 1 and 4, A indicates the top of a stove of any usual or approved construction, having an opening B through which the hot gases or the flame from the fire or a burner (not shown) may pass upwardly. The heater or cooking utensil has a bottom plate 10 provided with a central hole 11 adapted to register with said opening or outlet B when the heater is set on the stove, such heater resting on the stove by means of an annular rib or flange 12 depending from the bottom plate 10; such rib forming a continuous imperforate wall, so that the hot gases issuing from the outlet B are compelled to rise through the hole 11 of the bottom plate 10. At the outer edge of this plate, there is an upwardly-extending imperforate flange 13. So far as described in this paragraph, the two embodiments illustrated are alike.

Within the outer member formed by the plate 10 and flange 13, but spaced from such outer member, is located an inner member which in the construction illustrated by Figs. 1, 2, and 3 consists of a bottom plate 14 formed with a more or less conical downward projection or deflector 15 extending into or toward the hole 11. The inner edge of the plate 10, at the hole or opening 11, may be bent downward, as shown, corresponding substantially to the curvature of the adjacent portion of the projection or deflector 15, and preferably an upward bend is given to said plate 10, as indicated at 16, to form a draft-promoting annular throat or contraction between the plates 10 and 14.

The outer member has vertical ribs or lugs 17 extending on the inner surface of its flange 13 and preferably terminating flush with the upper edge of said flange. The plate 14 has its outer edge spaced from the outer member, and a further spacing of the two members is effected by horizontal (radial) lugs 18 extending between the bottom plates 10 and 14. The lugs 17 and 18 also form channels through which the hot gases entering at the hole 11 will pass first outwardly between the bottom plates 10 and 14, and then upwardly along the inside of the flange 13. The connection of the inner member with the outer member may be effected in various ways, and said members (with the lugs 17 and 18) might be cast in one piece; but I prefer to make the inner member as a separate removable casting, as shown, in which case the lugs 17 and 18 will generally be formed integral with the outer member.

On its inner surface, the inner member has horizontal lugs 22, on the upper surface of the bottom plate 14, so that a cooking pot or the like, indicated at C in Fig. 1, may not be in close surface contact with the inner member, but spaces will thus be left through which the hot gases issuing from the upper ends of the channels between the ribs 17 may pass along the outer surface of the pot C and under its bottom surface. It will be noted that the central portion of the inner member is unobstructed, and thus I may place within such member, cooking pots or like utensils of customary shape and construction, and of a diameter substantially equal to that of said inner member. In this respect, my invention is distinctly superior to certain existing constructions which can be used only with small dishes or pots, or with pots made specially to fit the interior of the heater. When, as illustrated, the flange 13 and the ribs 17 project upwardly beyond the inner member, the projecting portions will form an additional stop for the cooking pot.

On the outer surface of the flange 13 are located vertical ribs 23, with outwardly projecting lugs 24 at their lower ends. On these lugs is adapted to rest the lower edge of a removable cover comprising an imperforate top 25 and a depending cylindrical flange 26 having a sliding fit along the ribs 23. A handle 27 is provided on the cover, and handles 28 on the outer member of the heater.

The hot gases rising in the channels between the ribs 17 will be distributed uniformly by the cover to flow not only on the outside of the cooking pot C as described above, but over the top thereof as well and in contact with the upper portion, or with the food contained in such pot. Of course, several smaller pots may be placed within or upon the inner member, or in some cases the food (for instance potatoes) may be placed directly within or upon said member, without using a pot. The hot gases finally pass out downwardly through the vertical channels formed between the ribs 23 by the cover and the outer member, and escape at the lower edge of the cover flange 26.

The embodiment of my invention illustrated by Figs. 4, 5 and 6 is of the same general character as the one first described. The inner member, however, does not consist simply of the plate 14 formed with deflector 15 and lugs 22, but comprises, in addition thereto, a cylindrical flange 19 extending upwardly from the outer edge of the plate 14 and preferably terminating below the upper edge of the flange 13, so that the latter, with its ribs 17, may engage any outwardly-projecting portion of the pot C or the like and thus assist in keeping such pot in proper position. The flange 19 may have a sliding fit along the inner edges of the vertical ribs 17; in the construction first described, the outer edge of the plate 14 may have such a sliding fit along the ribs 17, see Fig. 2. Along the inner surface of the flange 19, I have shown vertical ribs 20 which will prevent close contact between the outer wall of the cooking pot C and the flange 19 and thus insure a sufficient passage for the hot gases even if the pot is so large as to just fit within the inner member. In the construction first described, the pot might be large enough to just fit between the ribs 17 of the outer member, which in this case would insure proper passage of the hot gases, in the same manner as set forth in connection with the ribs 20. Handles 21 may be provided on the inner member to facilitate lifting it off, or putting it in, and if desired, set screws 29 may be used for temporarily locking the inner member to the outer member. Instead of having ribs 23 and lugs 24 to co-operate with the cover as in Figs. 1, 2, and 3, the outer member has an exterior annular bead or flange 30 at its lower portion, to fit within the lower end of the cover flange 26 (see Fig. 4), which slides on or off, the said cover resting on an annular projection 31 of greater diameter than the bead or flange 30. In order to provide for the escape of the hot gases or vapors, the cover flange 26 is, in this case, made with an annular series of outlets 32 so located as to be above the flange 30 when the cover is in position as in Fig. 4.

The device is very efficient, easily handled, readily manufactured, and adapted for use in connection with cooking pots or the like of existing styles.

While I have described two satisfactory embodiments of my invention, it will be understood that various modifications may be made without departing from the nature of my invention as defined in the appended claims.

I claim as my invention:

1. A device of the class described, comprising an outer member having a bottom plate with a central opening and an annular flange projecting downwardly from said plate and adapted for contact with the top of a stove or the like, and an upward flange at the outer periphery of said bottom plate, an inner member having a bottom plate spaced from that of the outer member and formed with a deflector projecting toward the opening in the bottom plate of the outer member, the upper surface of the bottom plate of said member having lugs adapted to support a cooking pot or the like out of close contact with said inner member, and a cover having a top and a depending peripheral flange supported on the outer member and surrounding the flange thereof for the downward passage of hot gases.

2. A device of the class described, comprising an outer member having a bottom plate with a central opening and an annular flange projecting downwardly from said plate and adapted for contact with the top of a stove or the like, and an upward flange at the outer periphery of said bottom plate, an inner member having a bottom plate spaced from that of the outer member and formed with a deflector projecting toward the opening in the bottom plate of the outer member, the upper surface of the bottom plate of said inner member having lugs adapted to support a cooking pot or the like out of close contact with said inner member, ribs located in the space between the two bottom plates and subdividing said space into channels, and a cover having a top and a depending peripheral flange supported on the outer member and surrounding the flange thereof for the downward passage of hot gases.

3. A device of the class described, comprising an outer member having a bottom plate with a central opening and an annular flange projecting downwardly from said plate and adapted for contact with the top of a stove or the like, and an upward flange at the outer periphery of said bottom plate, an inner member having a bottom plate spaced from that of the outer member and formed with a deflector projecting toward the opening in the bottom plate of the outer member, the upper surface of the bottom plate of said inner member having lugs adapted to support a cooking pot or the like out of close contact with said inner member, upright ribs located along the inner face of the flange of the outer member, and a cover having a top and a depending peripheral flange supported on the outer member and surrounding the flange thereof for the downward passage of hot gases.

4. A device of the class described, comprising an outer member having a bottom plate with a central opening, an inner member having a bottom plate located above the first-named bottom plate and spaced therefrom for the passage of hot gases, said inner member being further provided with a deflector projecting towards the opening of said bottom plate, one of said plates being formed with a bend extending towards the other plate to form a gradually diminishing annular constriction of the space between said plates, said constriction being arranged concentrically of and surrounding said deflector, and a cover having a top and a depending flange supported on and spaced from said outer member to provide a channel having an opening at the bottom thereof for permitting the escape of hot gases from the device.

5. A device of the class described, comprising an outer member having a bottom plate with a central opening and an inner member having a bottom plate located above the first named bottom plate and spaced therefrom to provide upwardly open channels for the passage of hot gases, the central opening of the bottom plate of said outer member forming an inlet to such channels, and a cover fitted over the outer member and communicating with the outlet of such channels, said cover being spaced from the outer member to form downward outlet channels leading from the inside of the cover, between said cover and the outer member, to the surrounding air.

6. A device of the class described, comprising an outer member having a bottom plate with a central opening, an inner member fitted within said outer member and having a bottom plate and having means to hold said members with said plates in spaced relationship to provide a plurality of channels and afford a clear space across the inside of such inner member, from one point of its periphery to a diametrically-opposite point of such periphery, and a cover receiving the gases which rise through said channels between said members and forming, in conjunction with the outer member, outlet channels for the escape of such gases.

7. A device of the class described, comprising an outer member having a bottom plate with a central opening and an upward flange at the outer periphery of said bottom plate, an inner member having a bottom plate spaced from that of the outer member and formed with a deflector projecting toward the opening in the bottom plate of the outer member, and a cover having a top and a depending peripheral flange supported on the outer member and surrounding and spaced from the flange thereof to provide a channel for the downward passage of hot gases, and said channel being provided at its lower end with an opening to permit the escape of the hot gases.

8. A device of the class described, comprising an outer member having a bottom plate with an opening, an inner member set within said outer member and spaced therefrom to form channels between the two members, communicating with said opening, ribs on the outer surface of the outer member, and a removable cover having a flange fitted over said ribs and forming therewith channels which, like those between the two members, communicate with the space within the cover.

9. A device of the character described, comprising an outer member having a bottom plate with a central opening, an annular flange projecting downwardly from said plate and adapted for contact with the top of a stove or the like, and an upward flange at the outer periphery of said bottom plate, said flange being provided on its outer side with an outward projection at the lower portion thereof, an inner member having a bottom plate located above that of the outer member and spaced therefrom, said inner member bottom plate having a deflector projecting toward the opening in the bottom plate of the outer member, the upper surface of the bottom plate of the inner member being provided with lugs to keep a cooking pot or the like from close contact with the inner surface of the inner member, ribs located in the spaces between the inner and outer members and subdividing said spaces into channels, and a cover having a top and a peripheral flange contacting with and resting on said outward projection.

In testimony whereof I have signed this specification.

LEON SUSSMAN.